Sept. 28, 1937.  F. A. BOOTES  2,094,345
LAWN MOWER
Filed Oct. 22, 1935
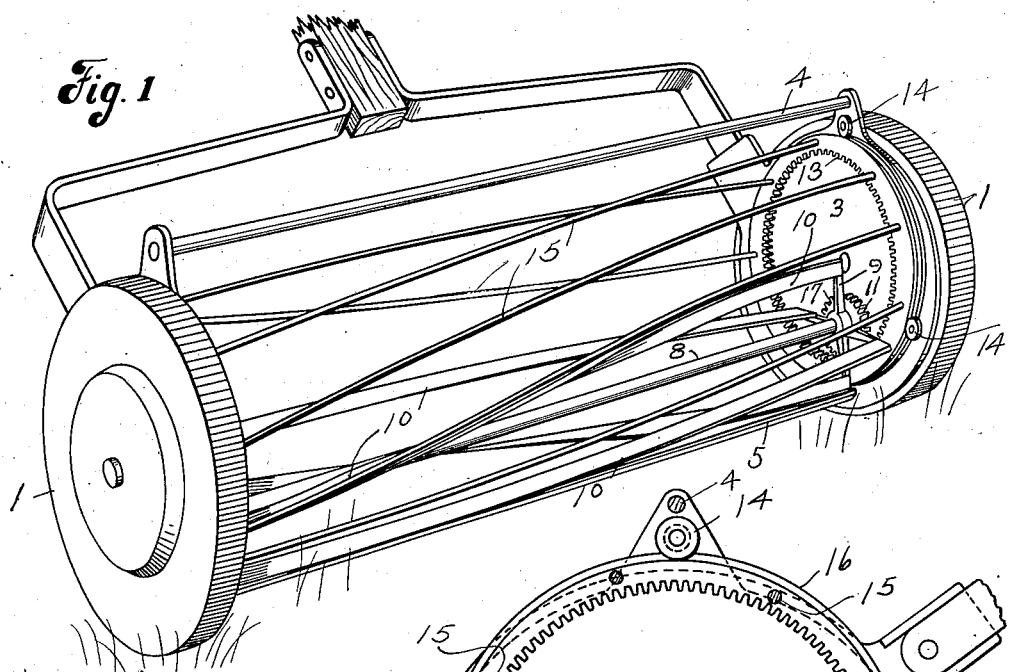
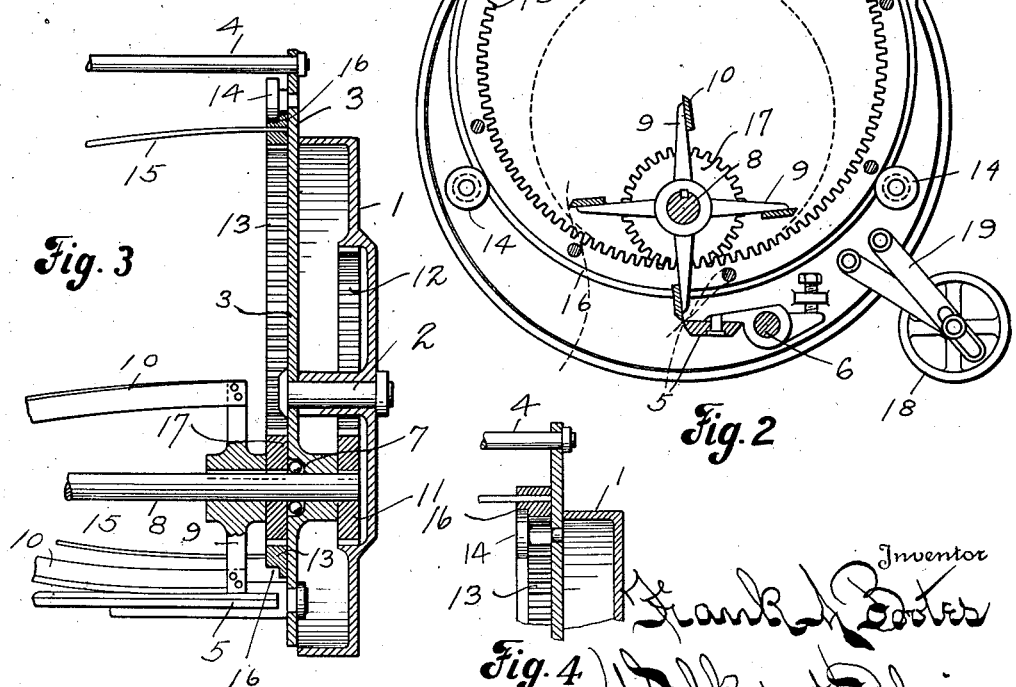

Patented Sept. 28, 1937

2,094,345

UNITED STATES PATENT OFFICE 2,094,345

LAWN MOWER

Frank A. Bootes, Dayton, Ohio, assignor of one-half to Howard F. Heald, Dayton, Ohio Application October 22, 1935, Serial No. 46,136

11 Claims. (Cl. 56—249)

This invention relates to improvements in lawn mowers of the revolving reel type, and more particularly to means for enabling increased ease of operation and adaptation of the mower for cutting unusually high grass.

To accommodate the ordinary mower to moderately high grass it is necessary to make the cutting reel of relatively large diameter. The reel being gear driven operates under quite inefficient leverage. The leverage power arm comprising the radius of the operating gear pinion is quite short. The work arm comprising the radius of the cutting reel is relatively long. To afford a more effective leverage and thereby minimize the required operating power, the present cutter reel is of relatively small diameter. That is to say the effective work arm is shortened in relation with the power arm. Therefore less effort is required to drive the reel. If used in high grass such small reel would merely bend the grass down and pass over without carrying it against the stationary cutter bar. Hence to enable operation in high grass there is provided a feeder reel of larger diameter which performs no cutting action but merely brings the long grass into the range of operation of the smaller cutter reel. The bars of the feeder reel cooperating with those of the cutter reel causes the longer grass to be folded upon itself and while in folded condition caught between the cutter reel bar and the stationary cutter bar and severed simultaneously in two places at points spaced from the fold.

The object of the invention is to improve the construction as well as the means and the mode of operation of lawn mowers whereby they may not only be economically manufactured, but will be more efficient in operation, more easily operated, possess a wider field of usefulness and be unlikely to get out of repair.

A further and primary object of the invention is to provide a more efficient operating leverage for the cutter reel whereby its cutting force will be increased and the power requirement materially decreased.

A further object of the invention is to provide a lawn mower having a cutter reel of relatively small diameter, and hence of easy operation, which will be operative in relatively high grass.

A further object of the invention is to provide a feeder reel for lawn mowers adapted to carry high grass into the operating zone of the cutter reel.

A further object of the invention is to provide a duo-functional mower adapted to simultaneously cut the high grass and trim the stubble.

A further object of the invention is to perform in a single operation the rough cutting and finish trimming which has heretofore been usually performed by separate mowers.

A further object of the invention is to provide a lawn mower possessing the advantageous structural features and meritorious characteristics herein mentioned.

With the above primary and other incidental objects in view, as will more fully appear in the specification, the invention consists of the features of construction, the parts and combinations thereof, and the mode of operation, or their equivalents, as hereinafter described and set forth in the claims.

In the drawing, wherein is shown the preferred, but obviously not necessarily the only form of embodiment of the invention, Fig. 1 is a perspective view of a lawn mower embodying the present invention.

Fig. 2 is a transverse sectional view thereof.

Fig. 3 is a longitudinal sectional view of one end of the mower structure, it being understood that the opposite end thereof is of like construction, but arranged in reverse order.

Fig. 4 is a detail view showing the assembly of gear ring, guide rollers and feeder reel.

Like parts are indicated by similar characters of reference throughout the several views.

As is well known, it is quite difficult, if not impossible, to propel an ordinary lawn mower through high grass. To accommodate the mower to moderately high grass the revoluble cutter reel which cooperates with a relatively fixed cutter bar must be of large diameter. The increase of the diameter of the cutter reel in relation with that of its driving gear pinion causes the mower to work hard. If the reel is not of large diameter it will not catch the high grass. It has therefore been the general practice on large estates, parks, and golf courses, to employ separate mowers for cutting high grass and subsequently close cutting the stubble. By the present construction both operations are performed simultaneously.

Referring to the drawing, 1—1 are the usual carrying and drive wheels mounted upon trunnions 2 projecting from the end plates or heads 3 of the main frame which are interconnected into a rigid structure by transverse brace rods 4—4. At the bottom of the frame a cutter bar 5 is adjustably mounted upon a transverse rod 6 also connecting the frame heads 3 and is adjusted about the rod 6 to vary its relation to the cutter reel and compensate for wear. The cutter bar 5 is mounted tangential to the path of travel of the reel bars 10. In the present instance the cutting edge of the bar is substantially upon the vertical axial plane of the carrying wheels, whereas usually, the cutter is spaced rearwardly thereof.

Mounted in suitable bearings 7 in the main frame, end plates 3 is the cutter reel comprising the rotary shaft 8 carrying at spaced intervals spiders 9 to which are attached helical blades 10. The reel is of much smaller diameter than is usually found in lawn mowers. A diameter of approximately three inches is found amply sufficient, although it may be greater or less according to the conditions of use and the character of the growth to be cut.

Carried upon each extremity of the cutter reel shaft 8 is a gear pinion 11 meshing with an internal gear 12 formed integral with the corresponding carrying or drive wheel 1. Thus the reel is rotated in unison with the carrying wheels but at a much faster rate of speed. The radius of the gear pinion 11 through which power is applied being more nearly equal to the radius of the cutter reel than is usually found in lawn mowers of the present type, enables the reel to be rotated with much less effort. Likewise the growth to be cut is more forcibly engaged due to such leverage relation.

Mounted eccentrically with the cutter reel but having its path approximately tangentially thereto is a feeder reel of much larger diameter. This feeder reel comprises terminal internal gear rings 13 located immediately adjacent to the inner faces of the end plates of the main frame, and interconnected one with the other by transverse feeder rods 15.

The gear rings 13 are mounted for rotation upon a series of spaced guide rollers 14 carried on the end plates 3 of the main frame. The gear rings 13 are provided with flanges 16 at their inner sides forming in each gear ring a peripheral rabbet within which the supporting and guide rollers 14 engage. The rollers overhang the margins of the gear rings thereby retaining them against lateral displacement. The engagement of the lowermost rollers 14 beneath the flanges 16 supports the gear rings and provides anti-friction bearings therefor. Rotary motion is transmitted at a slower rate of speed to the feeder reel in unison with the cutter reel by a gear pinion 17 carried upon the cutter reel shaft 8 and meshing with the gear rings 13. Suitable guard housings, not shown, are positioned about the rollers and gears. The rods 15 of the feeder reel like the cutter reel bars 10 are of helical curvature and are so spaced and the rotation of the feeder reel so timed that the rods of the latter will progressively enter between the bars 10 of the cutter reel as they approach and pass the cutter blade 5. They thus have an intermeshing relation somewhat similar to an internal gear and pinion movement.

Trailer wheels 18 are connected to the main frame by links 19 enabling adjustment of the wheels 18 relative to the main frame as is customary. The machine may be propelled by the usual push handle, or the apparatus in proper size may be incorporated in a power driven apparatus or attached to a tractor.

By positioning the cutter bar 5 at approximately the vertical axial plane of the carrying wheels 1, the mower may approach somewhat closer to obstructions and it is found that it may be operated more advantageously on terraces or inclined surfaces without tendency for side slip.

In operation, as the mower is advanced, the feeder reel and the cutter reel rotate in unison. The speed of rotation of the cutter reel is however much greater than that of the feeder reel. However the latter has sufficient transverse helical rods 15 that a feeder rod enters between each succeeding pair of cutter bars so as the respective rods and bars approach the stationary cutter bar 5. The feeder reel bars 15 are so placed that they pass above the cutter bar 5 in slightly spaced relation therewith. The cutter reel bars 10 pass the cutter bar 5 in shearing relation. The feeder reel being of relatively large diameter the advancing rods 15 pass over the top of the high grass and sweep the growth rearwardly. In so doing the feeder reel rod 15 passes beneath an advancing cutter reel bar 10 which engages the growth above the feeder reel rod 15 as the latter enters the zone of rotation of the cutter reel, and tends to push the engaged long grass forwardly over the engaging rod 15. At the same time the continued rearward movement of the feeder reel rod 15 draws the engaged material rearwardly beneath the descending cutter bar 10 thereby causing the growth to be reversely folded upon itself. The cutter reel bar being in engagement with the folded growth beyond the feeder reel rod 15 shears the folded grass as it passes the cutter simultaneously in two places in spaced relation with the fold. At the same time the cutter reel will catch and trim the shorter grass in the customary manner. The longer grass will be chopped into shorter length and will not be left in long unsightly tufts or bundles upon the lawn. By the present construction both the long and short grass may be simultaneously removed at the same operation.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a lawn mower, a main frame, a cutter bar, a rotary cutter reel cooperating with the cutter bar, drive wheels operatively connected with the cutter reel for rotating the reel as the mower advances, and a rotary feeder reel including circumferentially spaced longitudinal bars eccentrically disposed relative to the cutter reel and operatively connected with the drive wheels to rotate in unison with the cutter reel for carrying growths in advance of the zone of operation of the cutter reel into such zone.

2. In a lawn mower, a main frame, a cutter bar, a cutter reel and a feeder reel eccentrically mounted relatively to each other, the feeder reel being of substantially larger diameter than the cutter reel, and each including circumferentially spaced longitudinal bars travelling in paths approximately tangential and alternating at their point of tangency contiguous to the cutter bar for presenting growth thereto in position to be severed, the bars of the cutter reel cooperating with the cutter bar to sever the growth presented.

3. In a device of the character described, a cutter bar, a cutter reel having a plurality of cutting elements for cooperation with said cutter bar, and a rotatable circular feeder reel including circumferentially spaced longitudinal bars, said feeder reel being mounted eccentrically to and with the circumferential path of the feeder reel bars converging with the circumferential path of the cutting elements of the cutter reel in advance of the cutter bar and of greater diameter than said cutter reel, and means for rotating said cutter reel and said feeder reel in unison, the bars of said feeder reel engaging growth beyond the capacity of said cutter reel and carrying such growth into the effective radius of rotative movement of said cutter reel.

4. In a device of the character described, a cutter bar, a cutter reel having a plurality of circumferentially spaced cutting elements for cooperation with said cutter bars, and a feeder reel including circumferentially spaced longitudinal bars movable into the circumferential path of movement of said cutter reel in advance of the cutter bar, said feeder reel being mounted eccentrically to and of greater diameter than said cutter reel, and means for actuating said cutter reel and said feeder reel in unison with the bars of said feeder reel engaging growth beyond the capacity of said cutter reel and carrying such growth into the effective radius of rotative movement of said cutter reel.

5. In a lawn mower, a main frame, a cutter bar, a cutter reel cooperating with the cutter bar, drive wheels operatively connected with the cutter reel for rotating the reel as the mower advances, and a rotary feeding reel eccentrically disposed relative to the cutter reel and operatively connected with the drive wheels for unison rotation with the cutter reel including circumferentially spaced longitudinal growth engaging bars, the axis of rotation of the feeder reel being spaced from the axis of rotation of said cutter reel, and the feeder reel being of larger diameter than said cutter reel.

6. In a lawn mower, a main frame, a cutter bar, a cutter reel cooperating with the cutter bar, drive wheels operatively connected with the cutter reel for rotating the reel as the mower advances, and a rotary feeding reel eccentrically disposed relative to the cutter reel and operatively connected with the drive wheels for unison rotation with the cutter reel including circumferentially spaced longitudinal growth engaging bars, said feeder reel being mounted to rotate about an axis spaced from the axis of rotation of said cutter reel, and being of larger diameter than said cutter reel and engaging growth in advance of the path of rotative movement of said cutter reel and carrying such growth into the zone of operation of said cutter reel.

7. In a lawn mower, a main frame, a cutter bar, a cutter reel cooperating with the cutter bar, drive wheels operatively connected with the cutter reel for rotating the reel as the mower advances, and a rotary feeding reel eccentrically disposed relative to the cutter reel and operatively connected with the drive wheels for unison rotation with the cutter reel including circumferentially spaced longitudinal growth engaging bars, the axis of rotation of the feeder reel being spaced from the axis of rotation of said cutter reel, and the feeder reel being of larger diameter than said cutter reel and engaging growth in advance of the path of rotative movement of said cutter reel and below the axis of rotative movement of said feeder reel and carrying such growth into the zone of operation of said cutter reel.

8. In a lawn mower, a main frame, a cutter bar, a cutter reel having elements that cooperate with said cutting bar to provide a cutting action, a feeder reel having grass engaging elements thereon, and means for actuating said reels in unison, said feeder reel and said cutter reel being mounted eccentrically to each other and with the circumferential path of the grass engaging elements of the feeder reel converging with the circumferential path of the cutting element of said cutter reel in advance of the cutter bar.

9. In a lawn mower, a main frame, a cutter bar, a cutter reel having elements that cooperate with said cutting bar to produce a cutting action, a feeder reel including circumferentially spaced longitudinal bars, and means for actuating said reels in unison, said feeder reel and said cutter reel being mounted eccentrically to each other and with the circumferential path of said feeder reel bars converging with the circumferential path of the cutting elements of said cutter reel in advance of the cutter bar.

10. In a lawn mower, a main frame, a cutter bar, a cutter reel having elements that cooperate with said cutting bar to produce a cutting action, a feeder reel including circumferentially spaced longitudinal bars, and means for actuating said reels in unison, said feeder reel and said cutter reel being mounted eccentrically to each other and with the circumferential path of said feeder reel bars converging with the circumferential path of the cutting elements of said cutter reel as the paths of movement of the reels approach the cutter bar.

11. In a lawn mower, a main frame, a cutter bar, a cutter reel having elements that cooperate with said cutting bar to produce a cutting action, a feeder reel including circumferentially spaced longitudinal bars, and means for actuating said reels in unison, said feeder reel and said cutter reel being mounted eccentrically to each other and with the circumferential path of said feeder reel bars converging with the circumferential path of the cutting elements of said cutter reel as the paths of movement of the reels approach the cutter bar, and there being such a number of bars on the feeding reel that one of such bars will precede one of the elements of said cutter reel each time such an element approaches the cutter bar.

FRANK A. BOOTES.